United States Patent [19]

Neuberg et al.

[11] Patent Number: 4,748,005
[45] Date of Patent: May 31, 1988

[54] APPARATUS AND METHOD FOR RADIATION PROCESSING OF MATERIALS

[75] Inventors: William B. Neuberg, Perrineville, N.J.; Robert Luniewski, Smithtown, N.Y.

[73] Assignee: Shamrock Chemicals Corporation, Newark, N.J.

[21] Appl. No.: 374,015

[22] Filed: May 3, 1982

[51] Int. Cl.⁴ .............................. B01J 2/00; B29B 9/00
[52] U.S. Cl. ................................. 422/186; 250/432 R; 250/435; 522/3; 522/156
[58] Field of Search ..................... 422/186; 34/1, 4; 250/432 R, 435; 522/3, 156

[56] References Cited

U.S. PATENT DOCUMENTS

| | | | |
|---|---|---|---|
| 2,737,593 | 3/1956 | Robinson | 250/432 R |
| 2,858,442 | 10/1958 | Dewey | 56/453 |
| 3,440,466 | 4/1969 | Colvin et al. | 250/400 |
| 3,527,940 | 9/1970 | Balanca et al. | 250/434 |
| 3,655,965 | 4/1972 | Icre et al. | 250/435 |
| 3,766,031 | 10/1973 | Dillon | 522/156 |
| 3,780,305 | 12/1973 | Free | 250/435 |
| 3,878,164 | 4/1975 | Lott | 522/156 |
| 4,029,870 | 6/1977 | Brown et al. | 526/255 |
| 4,036,718 | 7/1977 | Brown et al. | 522/156 |
| 4,052,278 | 10/1977 | Brown et al. | 523/300 |
| 4,062,127 | 12/1977 | Pfeiffer et al. | 34/1 |
| 4,220,511 | 9/1980 | Derbyshire | 522/4 |

FOREIGN PATENT DOCUMENTS 1019440 2/1966 United Kingdom .
1516648 6/1975 United Kingdom .
1505284 3/1978 United Kingdom .

OTHER PUBLICATIONS

Perry, Ed. *Chemical Engineers' Handbook* 3rd Edition, McGraw-Hill Book Company, Inc., New York 1950, p. 1210.

Primary Examiner—Edward A. Miller
Assistant Examiner—Virginia B. Caress
Attorney, Agent, or Firm—Brumbaugh, Graves, Donohue & Raymond

[57] ABSTRACT

A method and apparatus for radiation degradation processing of polytetrafluoroethylene makes use of a simultaneous irradiation, agitation and cooling. The apparatus is designed to make efficient use of radiation in the processing.

17 Claims, 3 Drawing Sheets

APPARATUS AND METHOD FOR RADIATION PROCESSING OF MATERIALS

BACKGROUND OF THE INVENTION

This invention relates to radiation processing for the degradation of materials and specifically to radiation degradation of polytetrafluoroethylene (PTFE).

U.S. Pat. No. 3,766,031 to Dillon discloses a method for radiation processing of polytetrafluoroethylene, wherein the polytetrafluoroethylene is exposed to radiation and thereafter subjected to comminution to reduce the polytetrafluoroethylene to a fine particle powder. This powder is useful as a dry lubricant, for example, in paints and inks. This and other methods for carrying out this technique generally made use of electron beam or cobalt sources for irradiating the polytetrafluoroethylene. The material being irradiated was arranged in trays and exposed to multiple doses of radiation, approximately 2 to 15 MR per pass, so that the temperature of the material does not rise excessively, thereby to avoid discoloration of the material and the possible generation of noxious gases. The total dose is approximately 35 to 150 MR.

The tray irradiation technique has a radiation utilization efficiency of only approximately 35%. Radiation inefficiencies arise from the three factors, which are (1) overscan of trays, (2) gaps between trays and (3) depth-dose characteristics for an electon beam.

The need to assure complete and uniform radiation of a tray requires some overscan by the radiation and an efficiency loss of 5 to 15%. Likewise there is usually some space between trays of material which causes a further 10 to 15% loss of efficiency.

The largest efficiency loss arises out of the fact that the dose received by the material varies with material depth. This variation is illustrated in the graph of FIG. 6. Typically the dose at the surface, designated $R_o$, is taken as the nominal dose for the material. Beam energy and/or material depth is adjusted so that an equal dose at the opposite surface of the material (Depth D ). Radiation which passes entirely through the product (Area C) is not utilized. Radiation in Area B in excess of the nominal dose $R_o$ is likewise not used. This causes further inefficiency, and in some instances may result in undesired properties of the resultant product. Overall this depth-dose characteristic can cause processing inefficiency of up to 50%.

The prior art technique of slow irradiation of material by subsequent exposures to doses of radiation, occasionally coupled with stirring the material between exposures, tends to cause the production of radiation degraded polytetrafluoroethylene powder to be an expensive, inefficient and time consuming operation.

It is an object of the present invention to provide an apparatus and method for more efficiently producing radiation degraded polytetrafluoroethylene.

SUMMARY OF THE INVENTION

In accordance with the present invention there is provided an apparatus for radiation processing of chopped flowable solid materials having a high molecular weight to degrade the material to a lower molecular weight and render it grindable into a powder. The apparatus includes a processing vessel for holding the material, a radiation source for supplying radiation to the processing vessel, means for agitating the material during the processing, and cooling means for maintaining the vessel and the material below a selected temperature.

In a preferred embodiment the apparatus includes a dust cover over the vessel and dust collecting means for gathering airborne material particles which accumulate in the dust cover. In connection with the processing, air may be supplied to the material in order to fluidize the material and to additionally cool the material by the flow of air.

The processing vessel is preferably a ribbon blender which includes a vessel and motor driven stirrer for agitating the contents of the vessel. A preferred radiation source is a source of high energy electrons. The processing vessel can be cooled by a water flow channel surrounding the vessel.

In accordance with the invention there is provided a method for processing flowable solid polytetrafluoroethylene material by radiation degradation to reduce the molecular weight of the material and render it grindable into a powder. The method includes exposing the material to radiation, agitating the material during exposure, and maintaining the material at a temperature below 500° F. during exposure.

In a preferred embodiment the material is fluidized by an air flow during exposure and maintained below 250° F.

For better understanding of the present invention, together with other and further objects, reference is made to the following description, taken in conjunction with the accompanying drawings, and its scope will be pointed out in the appended claims.

DESCRIPTION OF THE INVENTION

Figure 1:
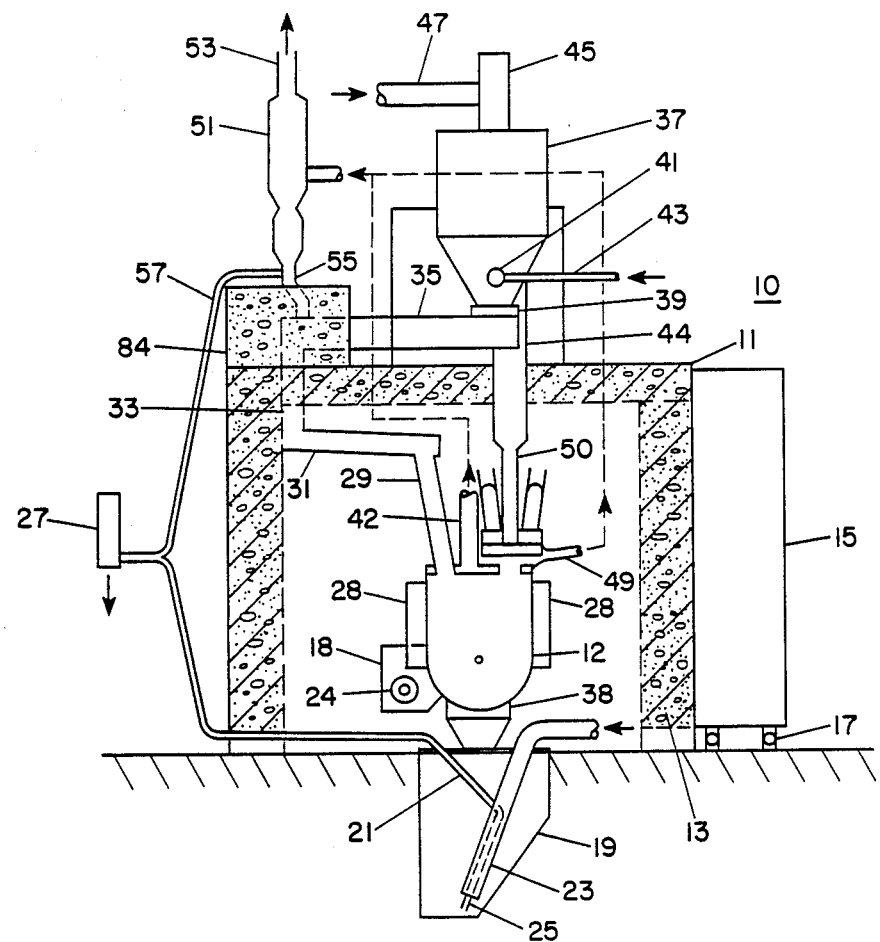
FIG. 1 is an end elevation view of a material processing apparatus in accordance with the present invention.

FIG. 1 is an end elevation view of an apparatus 10 for processing material in accordance with the present invention. Apparatus 10 is particularly useful for performing radiation degradation of polytetrafluoroethylene in order to degrade the material by reducing its molecular weight and render the material grindable into a powder.

Figure 4:
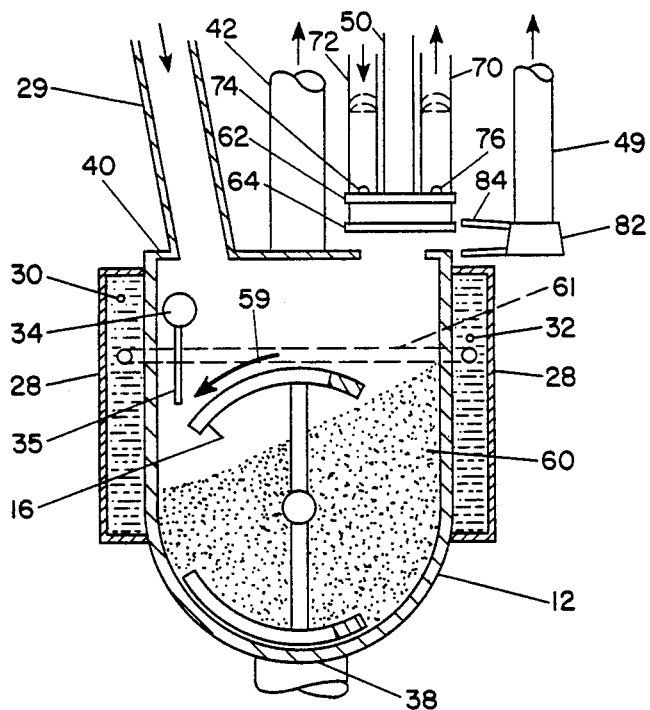
FIG. 4 is a cross-sectional view of the processing vessel of the FIG. 1 apparatus.
Figure 5:
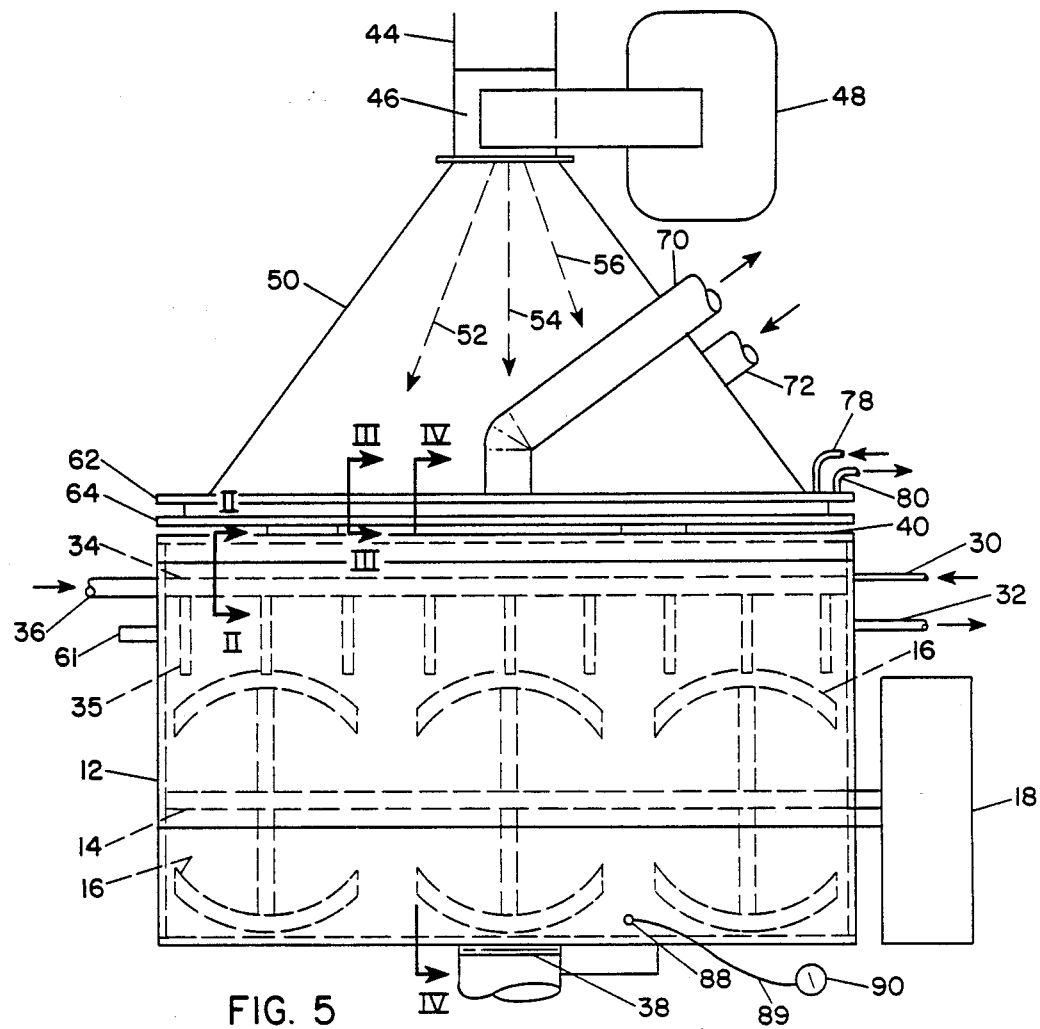
FIG. 5 is a side view of the processing vessel of the FIG. 1 apparatus.
Figure 6:
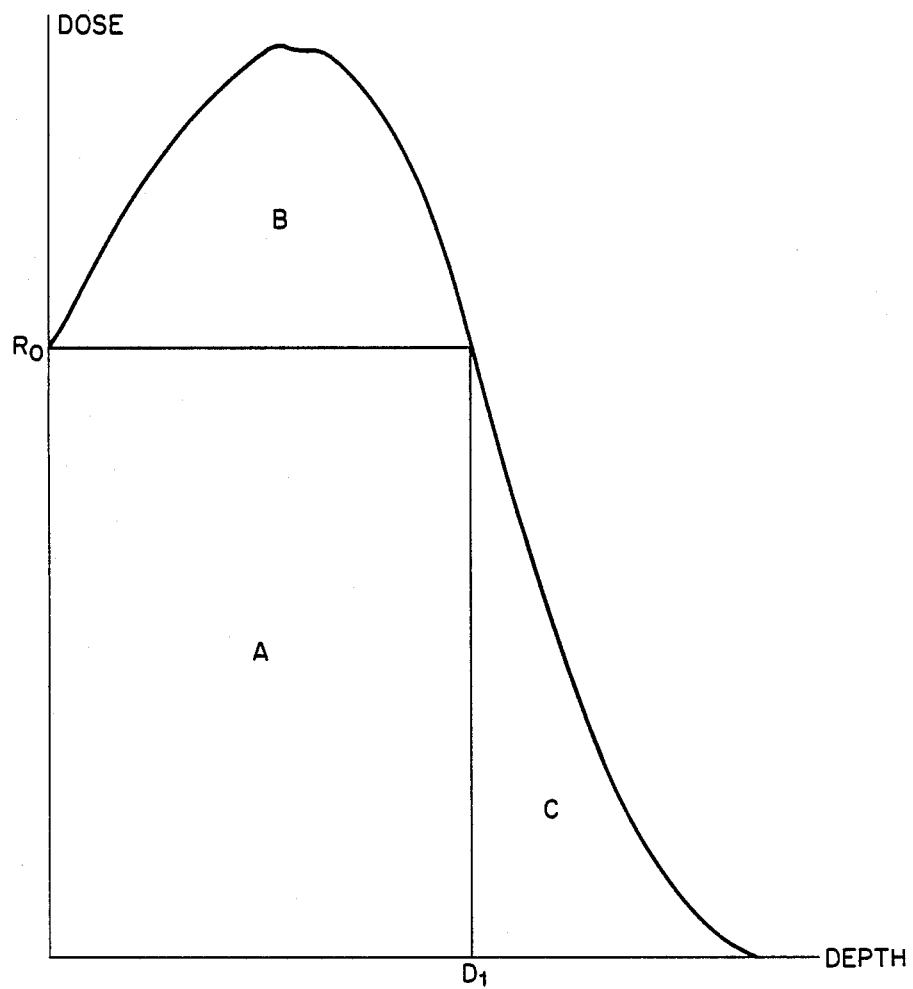
FIG. 6 is a graph illustrating radiation dose as a function of depth.

Apparatus 10 includes a processing vessel 12, which comprises the vessel of a ribbon blender, shown in greater detail in FIGS. 4 and 5. Vessel 12 includes a longitudinal shaft 14 having attached thereto ribbon blending paddles 16. Processing vessel 12 and its associated equipment are enclosed in a radiation chamber 11, made of masonry or other radiation attenuating material. Chamber 11 has an access opening 13 which is closed by door 15 mounted on rollers 17. Door 15 is provided for equipment access, and other openings, such as a zig-zag hallway, may be provided for personal access. As may be more easily seen by reference to FIGS. 4 and 5, the paddles are arranged so that the material within the ribbon blender is moved axially back and forth in the longitudinal direction of shaft 14 when the shaft is continuously rotated in the direction of arrow 59, and therefore the material undergoes no average axial displacement within the vessel.

Shaft 14 is driven by reduction gear 18 which is driven by motor 24. In a typical embodiment the shaft rotates at a speed of approximately 40 revolutions per minute, stirring and agitating material 60 which has been placed on the inside of the vessel 12.

In one embodiment, the vessel 12 has paddles with a radius of 18 inches and is 72 inches in length. The vessel is provided with a remote control outlet opening 38 in the bottom, for use in draining material after processing. Opening 38 is arranged above material receiving chamber 19, so that upon opening processed material in vessel 12 will flow into the receiving chamber 19. The material is removed from the receiving chamber by a vacuum apparatus 27 which draws the material into nozzle 25 and through conduit 21. Air inlet conduit 23 is arranged concentric to nozzle 25 to provide an air supply for material removal by the vacuum apparatus. Alternately a screw conveyer might be used.

In addition, the vessel is provided with a cooling jacket 28 for the flow of cooling water in order to maintain the vessel and its contents at a temperature below approximately 500° F., preferably below approximately 250° F. Water is provided through inlet and outlet conduits 30 and 32 and flows between separate portions of jacket 28 via conduit 61.

The cooling water is preferably supplied at a temperature which is above the dew point of the surrounding air to avoid condensation. Because the radiation processing of PTFE can release fluorine gas, which combines with water to form hydrofluoric acid, such condensation can cause acid formation and rapid corrosion of the equipment. One method of increasing supply water temperature is to use the cooling water to first cool the power supply of the electron beam apparatus, and thereafter use the same water at elevated temperature to cool the vessel. Instead of using the same water, a water-to-water heat exchanger can be used. Another technique is to use a conventional water heater to maintain water temperature above the dew point.

The apparatus of the present invention also includes mechanisms for supplying flowable solid material to the processing vessel 12. This equipment includes a generally vertical chute 29 leading into the processing vessel and communicating at its upper end with a horizontal screw conveyor 31, which is located within radiation chamber 11. Vertical chute 33 passes through the top of radiation chamber 11 and connects interior screw conveyor 31 with exterior screw conveyor 35. The region surrounding vertical shaft 33 is provided with additional radiation shielding structure 84, which may be fabricated out of bricks or the like. Exterior screw conveyor 35 receives granular material to be processed from the bottom of hopper 37, which is provided with a remote control valve 39 and a vibrator 41 operated by compressed air supplied over conduit 43. Granular material is supplied to hopper 37 by conduit 47 through which material is drawn by vacuum apparatus 45.

Processing vessel 12 is provided with a cover 40 and a vent conduit 42 through which air is exhausted under lower than atmospheric pressure in order to remove airborne material particles and fluorine gases from the processing vessel so that they do not accumulate and corrode the window of the electron beam source. An additional venting conduit 49, having lower end 82 with a nozzle 84, arranged near the outlet of the electron beam source, may also be provided.

Conduits 42 and 49 are connected to a cyclone separator 51, which separates airborne material particles from exhaust gases, which are vented through conduit 53. Particles which accumulate in separator 51 may be returned to the processing vessel over conduit 55 during initial stages of the processing. At later stages of the processing, the material collected by separator 51 is sufficiently degraded so that it may be provided over conduit 57 to output vacuum apparatus 27.

Figure 3:
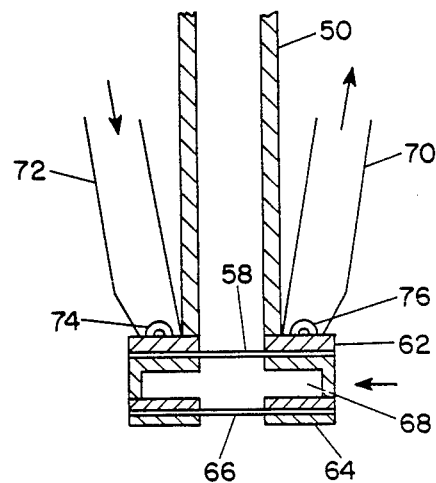
FIG. 3 is a cross-sectional view of a portion of the electron beam radiation source of the FIG. 1 apparatus.

The electron beam accelerator, which is used to provide a radiation source for the FIG. 1 apparatus includes a vacuum output passage 44 which is connected to a sectoral horn 50 by a beam steering section 46 (not shown in FIG. 1), which is provided with an electromagnet 48, shown in FIG. 5. The electron beam source used has an electron acceleration of 1 million volts, and can provide beam current of up to 100 milli-amperes. Beam steering section 46 causes the beam to oscillate back and forth in the sectoral horn 50 to assume beam paths 52, 54 and 56, illustrated in FIG. 5, thus spreading the radiation along the length of vessel 12. The electron beam exists from the vacuum portion of sectoral horn 50 through primary window 58 and optional secondary window 66 respectively, which are shown in detail in FIG. 3. The space 68 between the primary and secondary windows is provided with a flow of cooling air through conduits 70 and 72. In addition, conduits 74 and 76 are provided on flange 62, and possibly also on flange 64, to provide water cooling of the windows. Cooling water is supplied through conduits 78 and 80 and preferably has a temperature above the dew point of the surrounding air to avoid condensation and possible formation of hydrofluoric acid as described above. Windows 58 and 66 comprise thin sheets of titanium, with a thickness of between 0.00075 inches and 0.002 inches. Primary window 58 has a preferred thickness of 0.0015 inches in order to support vacuum pressure. Secondary window 66 does not require the same mechanical strength, but a comparable thickness is preferred in order to provide corrosion resistance.

In connection with the processing of materials, such as PTFE in accordance with the present invention, it is desirable to supply a flow of air to the material in the processing apparatus. The air flow serves three functions: (1) the supply of air tends to provide fluidizing of the flowable solid material so that it flows easily when agitated by stirrer paddles 16; (2) the supply of air tends to promote the degradation reaction, which requires oxygen; (3) the supply of air into the reaction vessel and out through conduit 42 tends to promote cooling of the material, as a supplement to the cooling provided by water jacket 28.

Figure 2:
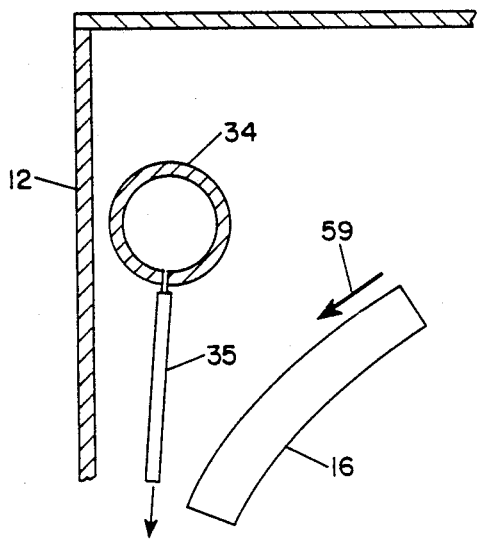
FIG. 2 is a partial cross-sectional view of the FIG. 1 apparatus showing an air supply manifold.

In the embodiment shown in detail in FIG. 2, air is provided to the reaction vessel through manifold 34, which has air outlet passages 35 directed into the material contained in the vessel. Compressed air is supplied over conduit 36.

In a typical process, flowable solid material such as virgin or scrap polytetrafluoroethylene, in course powder or chip form is placed into the vessel 12 and subjected to agitation by the rotation of stirrers 16 while undergoing irradiation by means of electron beams supplied from electron source 44. The electron beam from source 44 is steered in vacuum passage 46 by alternating currents applied to electromagnet 48 so that the electron beam diverges in sectoral horn 50 into paths which are spread out in one angular direction along the length of the vessel 12 as indicated by beams 52, 54 and 56. The action of stirrers 16 rotating in direction 59 tends to circulate the material for uniform irradiation. The electron beams exit from the sectoral horn vacuum through windows 58 and 66. The irradiation by the electron beam, in combination with the stirring action of stirrer 16 of the ribbon blender causes the degradation of the material to lower its molecular weight from around 5,000,000 to 10,000,000 to less than 1,000,000 and probably less than 100,000. When the molecular weight of the material is thus lowered, it becomes grindable into a powder. In order to promote the reaction by supply of oxygen, provide further cooling of the material during the irradiation process, while the material is undergoing reaction, and in order to make the material more fluid and easier to stir, air may be provided by conduit 36 into manifold 34 which has outputs 35 distributed along the length of vessel 12.

By reason of the agitating action of the stirrers 16, in addition to the air provided to conduit 34, the process may produce a considerable amount of airborne particles. These particles are constrained within dust cover 40, which is provided with an outlet conduit 42, which is positively ventilated through dust collector 51, whereby the recovered material can be recycled into the process vessel or collected as degraded, low molecular weight product through conduits 55 and 57.

It should be noted as shown in the cross-sectional view of FIG. 4 that the action of the stirrers 16 rotating in the direction of arrow 59 will cause the process material 60 build up on one side, for example, the right side, of the reaction vessel 12. In order to provide the most effective radiation treatment, the sectoral horn 50 is directed to a selected region of irradiation at this side of the reaction vessel, so that the electron beams intercept the maximum amount of material to be processed. By directing radiation into the portion of the vessel having a larger depth of material, the efficiency of the process is enhanced, since essentially all of the incident radiation is intercepted by material, rather than passing through without reaction. Further, overradiation which might normally occur for material close to the surface upon which the radiation is incident is avoided by reason of the agitation of the material by the paddles 16.

In order to provide processing of polytetrafluoroethylene in accordance with the method of the present invention using the apparatus of FIG. 1, scrap or virgin polytetrafluoroethylene in flowable solid form such as coarse powder or chips, either sintered or unsintered is supplied to the vessel through chute 29. Typically during processing the volume of the charge of material provided to the reaction vessel is reduced as the bulk density of the material is increased during processing. Processing of a batch of material (approximately 3200 lbs.) may use an electron beam accelerated at 1 million volts with a current of 20 to 100 milliamps for six or seven hours. As an alternate to the use of an electron beam accelerator, a radioactive material, such as Cobalt-60 can provide the radiation. Typically only a portion of the full load of material is initially supplied to vessel 12, for example, one-third to one-half the load. Since the bulk density of chip form PTFE is generally low, this fills the volume of the vessel. Following initial irradiation additional material can be added because of the increase in bulk density and consequent reduction of material volume during irradiation. After the full load of material is provided irradiation, agitation and cooling continues until the material receives a dose of 125 to 150 Mrad per pound. During this processing, the temperature of the material is monitored by thermal sensor 88, which is connected by wire 89 to remote meter 90. When the temperature of the material exceeds a selected value, the radiation beam current is reduced. The maximum temperature should be below 500° F., preferably below 250° F.

While there has been described what is believed to be the preferred embodiment of the present invention, those skilled in the art will recognize that other and further modifications may be made thereto without departing from the spirit of the invention, and it is intended to claim all such embodiments as fall within the true scope of the invention.

We claim:

1. Apparatus for batch radiation processing of a high molecular weight, flowable solid polytetrafluoroethylene material to degrade said material to lower its molecular weight and render it grindable into a powder, comprising a processing vessel for holding a batch of said material during processing, a source of particle radiation for supplying radiation to a selected region of said processing vessel, mechanical stirring means for agitating said material in said processing vessel during said processing thereby to repeatedly move said material into and out of said selected region whereby said material is uniformly irradiated, and water cooling means for maintaining said vessel and said material below a selected temperature during said processing.

2. The apparatus of claim 1 wherein there is further provided a dust cover over said vessel, and dust collection means associated with said dust cover.

3. The apparatus of claim 1 or 2 wherein there is further provided means for supplying air to said material thereby to cool said material, maintain said material in a fluidized state and provide oxygen to said material.

4. Apparatus as specified in claim 1 wherein there is further provided a radiation shield surrounding said processing vessel and said radiation source.

5. Apparatus as specified in claim 4 wherein there is further provided means for supplying flowable solid material through said radiation shield to said vessel.

6. Apparatus as specified in claim 4 or 5 wherein said processing vessel includes an outlet opening, and wherein there is provided a receiving chamber, communicating with said outlet opening for receiving processed material from said vessel.

7. Apparatus as specified in claim 6 wherein there is provided means for removing processed material from said chamber and transporting said material through said shield.

8. Apparatus for batch radiation processing of a high molecular weight, flowable solid polytetrafluoroethylene material to degrade said material to lower its molecular weight and render it grindable into a powder, comprising a ribbon blender, including a vessel for holding a batch of said material during processing and a motor stirrer for agitating said material, a source of particle radiation for supplying radiation to a selected region of said vessel, a water jacket for cooling said vessel and said material below a selected temperature during said processing and a dust cover and collector covering said vessel and removing airborne material particles therefrom.

9. Apparatus as specified in claim 8 wherein said radiation source comprises a source of high energy electrons and deflection means for distributing said electrons to the contents of said vessel.

10. Apparatus as specified in claim 9 wherein said source of high energy electrons includes a vacuum passage for said electrons having an aperture through which electrons pass into said vessel, wherein said aperture is provided with primary and secondary aperture windows, and wherein there is provided a flow of air between said windows.

11. Apparatus as specified in claim 9 wherein said source of high energy electrons includes a vacuum passage for said electrons having an aperture through which electrons pass into said vessel, wherein said aperture is provided with an aperture window, wherein there is provided water cooling for said window, and wherein said cooling water is provided at a temperature above the dew point of the surrounding air.

12. Apparatus as specified in claim 9 wherein said stirrer causes said material to accumulate on one side of said vessel, and wherein said selected region is on said one side.

13. Apparatus as specified in any of claims 8 through 12 wherein there is provided means for supplying an air flow to said vessel to cool said material, fluidize said material and provide oxygen to said material.

14. Apparatus as specified in claim 8 wherein there is further provided a radiation shield surrounding said processing vessel and said radiation source.

15. Apparatus as specified in claim 14 wherein there is further provided means for supplying said material through said radiation shield to said vessel.

16. Apparatus as specified in claim 14 or 15 wherein said processing vessel includes an outlet opening, and wherein there is provided a receiving chamber, communicating with said outlet opening for receiving processed material from said vessel.

17. Apparatus as specified in claim 16 wherein there is provided means for removing processed material from said chamber and transporting said material through said shield.

* * * * *

UNITED STATES PATENT AND TRADEMARK OFFICE
CERTIFICATE OF CORRECTION

PATENT NO.   : 4,748,005
DATED        : May 31, 1988
INVENTOR(S)  : Neuberg et al.

It is certified that error appears in the above-identified patent and that said Letters Patent is hereby corrected as shown below:

On first page of patent, under "References Cited" add the following Foreign Patent Document:

0017349 6/1980 European

Column 1, line 40, "equal dose" should read --equal dose is received--;

Column 4, line 25, "exists" should read --exits--;

Column 4, line 62, "course" should read --coarse--;

Column 5, line 33, "build up" should read --to build up--.

Signed and Sealed this

Eleventh Day of April, 1989

*Attest:*

DONALD J. QUIGG

*Attesting Officer*     Commissioner of Patents and Trademarks